United States Patent
Nishimura (10) Patent No.: US 7,256,947 B2
(45) Date of Patent: Aug. 14, 2007

(54) OPTICAL ELEMENT HAVING MINUTE PERIODIC STRUCTURE

(75) Inventor: Takeshi Nishimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/916,121

(22) Filed: Aug. 11, 2004

(65) Prior Publication Data

US 2005/0036215 A1 Feb. 17, 2005

(30) Foreign Application Priority Data

Aug. 13, 2003 (JP) ............................. 2003-293140

(51) Int. Cl.
*G02B 3/00* (2006.01)
*G02B 3/08* (2006.01)

(52) U.S. Cl. ..................... 359/722; 359/741

(58) Field of Classification Search ............... 359/722, 359/741–742, 569, 574
See application file for complete search history.

(56) References Cited

U.S. PATENT DOCUMENTS 6,650,477 B2 * 11/2003 Nakai ........................ 359/569

| 2002/0089750 | A1 * | 7/2002  | Hoshi    | 359/566 |
|--------------|------|---------|----------|---------|
| 2003/0058547 | A1 * | 3/2003  | Hori et al. | 359/642 |
| 2003/0112522 | A1 * | 6/2003  | Fujimoto | 359/619 |
| 2003/0156325 | A1 * | 8/2003  | Hoshi    | 359/486 |
| 2003/0210468 | A1 * | 11/2003 | Kato     | 359/642 |
| 2005/0036212 | A1 * | 2/2005  | Saito    | 359/708 |

FOREIGN PATENT DOCUMENTS

| JP | 58-174906   |   | 10/1983 |
|----|-------------|---|---------|
| JP | 2001-183506 | * | 10/1983 |
| JP | 01-252902   |   | 10/1989 |
| JP | 2001-183506 |   | 7/2001  |

* cited by examiner

*Primary Examiner*—Jordan M. Schwartz
(74) *Attorney, Agent, or Firm*—Morgan & Finnegan, L.L.P.

(57) ABSTRACT

An optical element is disclosed which has a reflection suppressing function and a color balance correcting function in a minute periodic structure. The optical element has a base member and a minute periodic structure which is provided on a surface of the base member and has a period smaller than a wavelength of incident light on the optical element. The minute periodic structure has a characteristic that the reflectance of light a first wavelength on a short wavelength side in a wavelength range of the incident light is lower than the reflectance of light at a second wavelength on a long wavelength side in the wavelength range of the incident light.

12 Claims, 7 Drawing Sheets

OPTICAL ELEMENT HAVING MINUTE PERIODIC STRUCTURE

BACKGROUND OF THE INVENTION

1. Field of the Invention

The present invention relates to an optical element having a minute periodic structure with a period smaller than the wavelength of incident light.

2. Description of the Related Art

Various optical elements are used in optical systems for use in an optical apparatus such as a silver-haloid camera, a digital still camera, a video camera, and a projector.

When light passes through an interface between media with different refractive indexes, for example between air and glass, Fresnel reflection occurs to cause degraded optical performance.

An approach to suppress the Fresnel reflection is to provide a reflection suppressing function by applying a low refractive index material such as $MgF_2$ and $SiO_2$ with an appropriate thickness to a surface of an optical element. In addition, an approach recently proposed is to use a reflection suppressing function provided by a minute periodic structure with a period smaller than the wavelength of incident light.

Such an element with the reflection suppressing function having a minute periodic structure has been proposed in Japanese Patent Application Laid-Open No. S58 (1983)-174906, Japanese Patent Application Laid-Open No. H1 (1989)-252902, and Japanese Patent Application Laid-Open No. 2001-183506.

In each of such elements with the reflection suppressing function, since a minute periodic structure is formed directly on a substrate, more flexible design is allowed because of no limitations on the low refractive index material as compared with the case where the thin film is used. When molding is employed to simultaneously form the substrate and the minute periodic structure, the advantage of cost is provided.

The aforementioned proposals, however, do not clearly describe the specific uses of the elements with the reflection suppressing function having minute periodic structures.

By way of example, consider a single lens having a thickness of 10 mm, a radius of curvature R1 of a surface on an object side equal to 100 mm, a radius of curvature R2 of a surface on an image plane side equal to −100 mm, a refractive index Nd of a material equal to 1.84666, and an Abbe number νd equal to 23.8.

Figure 9:
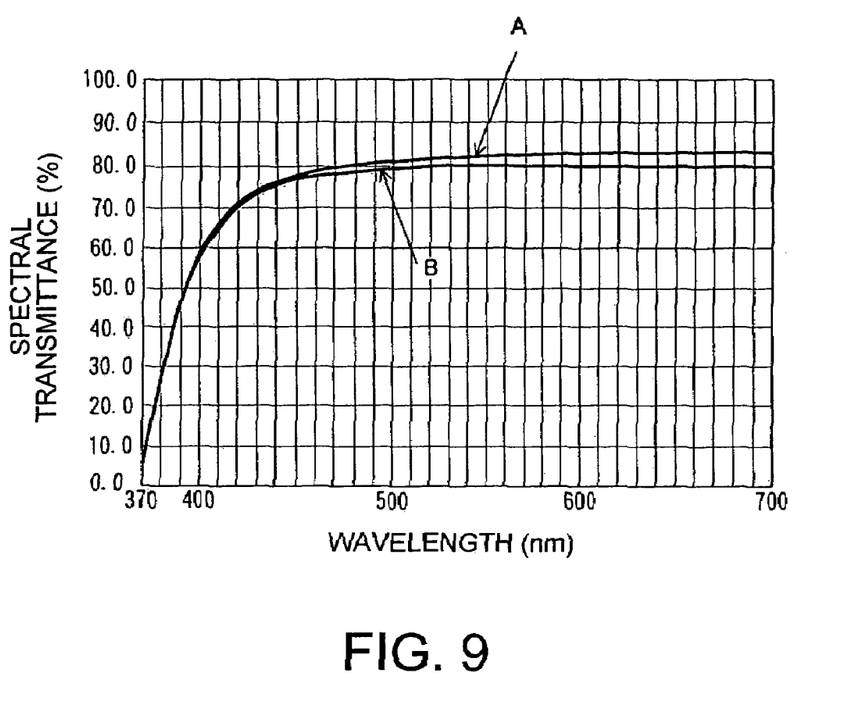
FIG. 9 is a graph showing the transmittance characteristic of an optical element which has the minute periodic structure of Embodiments 1 to 3 or an optical system including the optical element.

A characteristic curve A in a graph of FIG. 9 represents spectral transmittance as an optical system when the single lens have neither a minute periodic structure nor an anti-reflection film formed thereon. In the graph of FIG. 9, the horizontal axis represents a wavelength, and the vertical axis represents the spectral transmittance.

If the optical system having the single lens is used to take images with a silver-haloid film, color representations in taken images are determined by the spectral transmittance of the optical system and the sensitivity of the film. In the spectral transmittance shown as the characteristic curve A in FIG. 9, the transmittance is relatively low at shorter wavelengths, so that white color does not appear as pure while in taken images but looks as yellowy white.

SUMMARY OF THE INVENTION

It is an illustrative object of the present invention to provide an optical element which has a reflection suppressing function and a color balance correcting function provided by a minute periodic structure formed on the optical element, an optical system having the optical element, and an optical apparatus having the optical system.

According to one aspect, the present invention provides an optical element having a base member and a minute periodic structure which is provided on a surface of the base member and has a period smaller than a wavelength of incident light on the optical element. The minute periodic structure has a characteristic that the reflectance of light at a first wavelength on a short wavelength side in a wavelength range of the incident light is lower than the reflectance of light at a second wavelength on a long wavelength side in a wavelength range of the incident light.

These and other characteristics of the optical element, the optical system, and the optical apparatus of the present invention will be apparent from the following description of specific embodiments with reference to the drawings.

DETAILED DESCRIPTION OF THE PREFERRED EMBODIMENTS

Embodiments of the present invention are hereinafter described with reference to the drawings.

Embodiments 1 to 3

Figure 1:
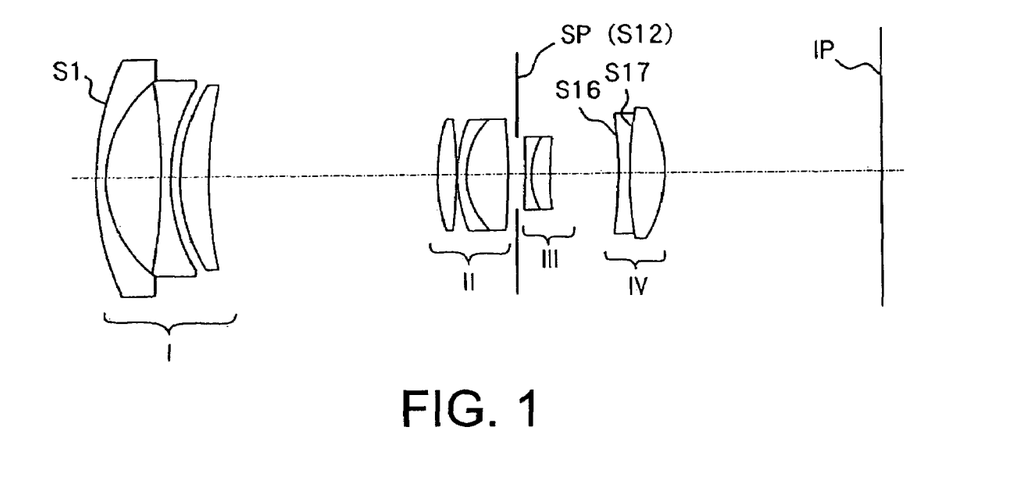
FIG. 1 is a section view showing the structure of an optical system which is Embodiment 1 of the present invention.
Figure 2:
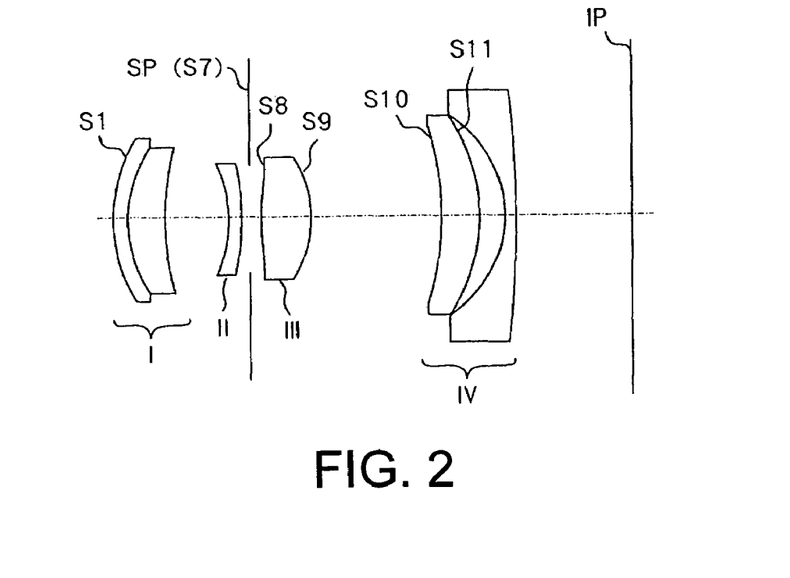
FIG. 2 is a section view showing the structure of an optical system which is Embodiment 2 of the present invention.
Figure 3:
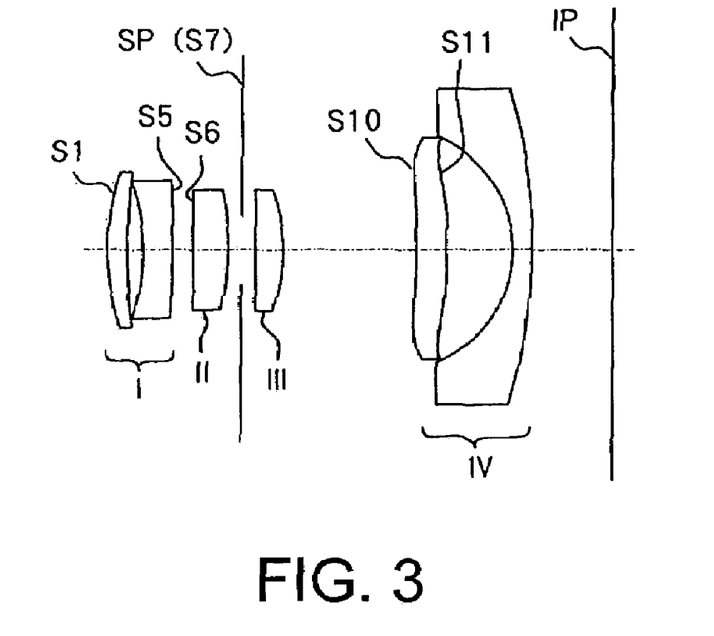
FIG. 3 is a section view showing the structure of an optical system which is Embodiment 3 of the present invention.

FIG. 1 shows the structure of an image-taking optical system which is Embodiment 1 of the present invention, FIG. 2 shows the structure of an image-taking optical system which is Embodiment 2 of the present invention, and FIG. 3 shows the structure of an image-taking optical system which is Embodiment 3 of the present invention. In FIGS. 1 to 3, reference numerals I, II, III, and IV show a first lens unit, a second lens unit, a third lens unit, and a fourth lens unit, respectively. SP shows a stop, and IP shows an image plane, respectively.

In the image-taking optical system of Embodiment 1 shown in FIG. 1, a 17th surface S17 is an aspherical surface, and a minute periodic structure with a period smaller than the wavelength of incident light (visible light in Embodiment 1) is formed on each of a 16th surface S16 and the 17th surface S17.

In the image-taking optical system of Embodiment 2 shown in FIG. 2, 8th to 11th surfaces S8 to S11 are aspherical surfaces, and a minute periodic structure is formed on each of a 10th surface S10 and the 11th surface S11.

In the image-taking optical system of Embodiment 3 shown in FIG. 3, a fifth surface S5 and a sixth surface S6, and a 10th surface S10 and an 11th surface S11 are aspherical surfaces, and a minute periodic structure is formed on each of the 10th surface S10 and the 11th surface S11.

In Embodiments 1 to 3, all of lens elements having the aspherical surfaces described above are realized by plastic lenses.

Figure 4:
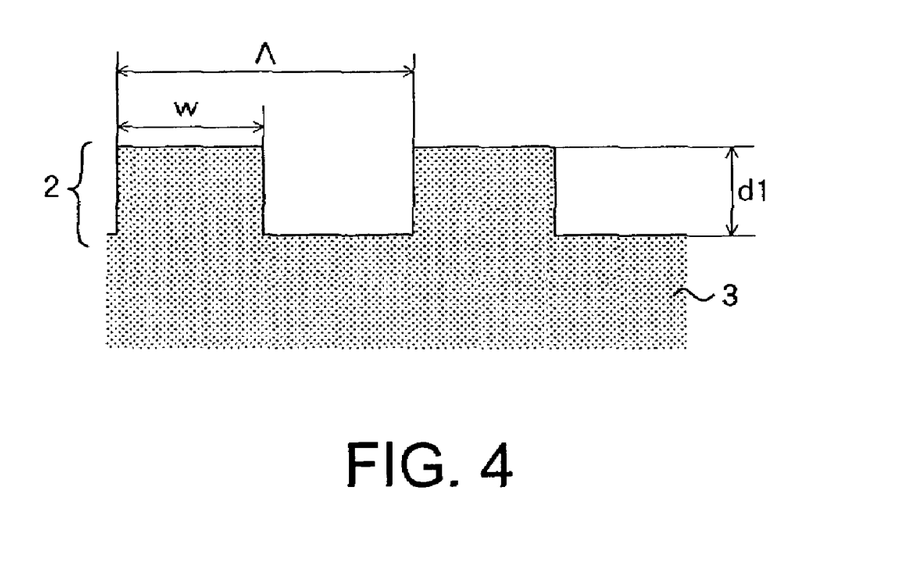
FIG. 4 is a schematic diagram showing an example of the shape of a minute periodic structure.
Figure 6:
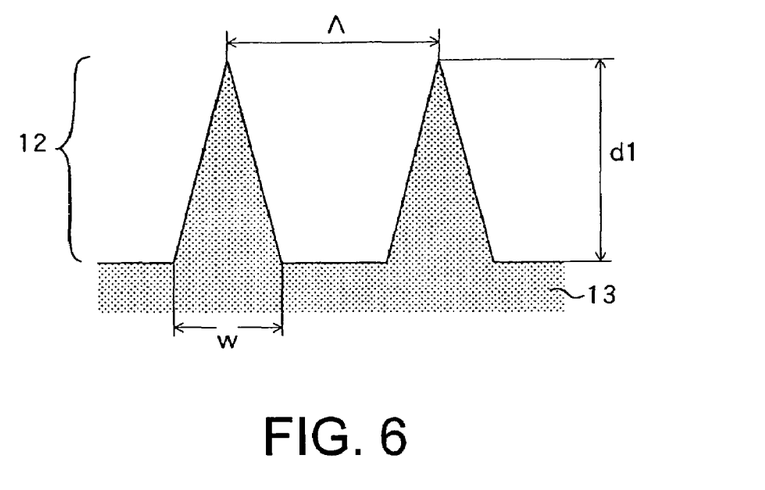
FIG. 6 is a schematic diagram showing an example of the shape of the minute periodic structure.

The aforementioned minute periodic structures are formed, for example, as a minute periodic structure as shown in FIG. 4 in which grating elements 2 with a rectangular section are periodically arranged, or a minute periodic structure as shown in FIG. 6 in which grating elements 12 with a triangular section are periodically arranged. The minute periodic structures can be provided with a reflection suppressing function. The minute periodic structures are formed on substrates (for example, lens elements) 3 and 13.

Description is now made for the structure of a generally used anti-reflection film and reflectance characteristics. The anti-reflection film widely used is provided by applying a material (such as $MgF_2$ and $SiO_2$) with a refractive index lower than a refractive index of a substrate (for example, a lens element) with an appropriate thickness.

Figure 12:
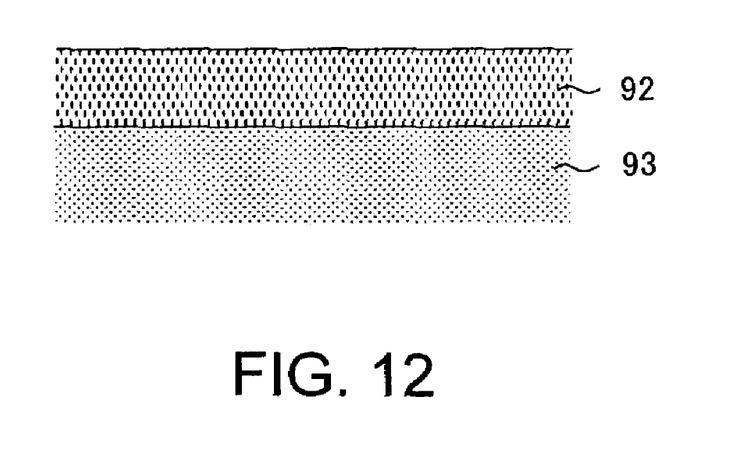
FIG. 12 is a schematic diagram showing the structure of a single layer anti-reflection film.

FIG. 12 is a schematic diagram of a single layer anti-reflection film having the structure in which a single layer of a low refractive index material 92 is applied to a surface of a substrate 93. For the single layer anti-reflection film, the film thickness of the single layer can be designed by using the following conditions:

$$n = (ni \times ns)^{1/2} \quad (1)$$

$$nd \cos \theta = \lambda/4 \times (2m-1) \quad (2)$$

where ni represents the refractive index of a material (a medium) on the incident side, ns the refractive index of a material (a medium) on the substrate side, n the refractive index of a thin film material applied to the substrate 93, d the film thickness of the thin film material, θ the incident angle of incident light, λ a design wavelength, and m an integral number.

The refractive indexes of the materials and the optical film thickness designed to satisfy the conditions (1) and (2) can achieve a reflectance of zero at the design wavelength λ. In general, however, there is no combination of a substrate material and a thin film material which completely satisfies the condition (1), so that the reflectance can hardly be equal to zero at the design wavelength.

When a reduced reflectance is desired in a wider band, a greater reflection suppressing effect can be provided by stacking thin films.

Figure 13:
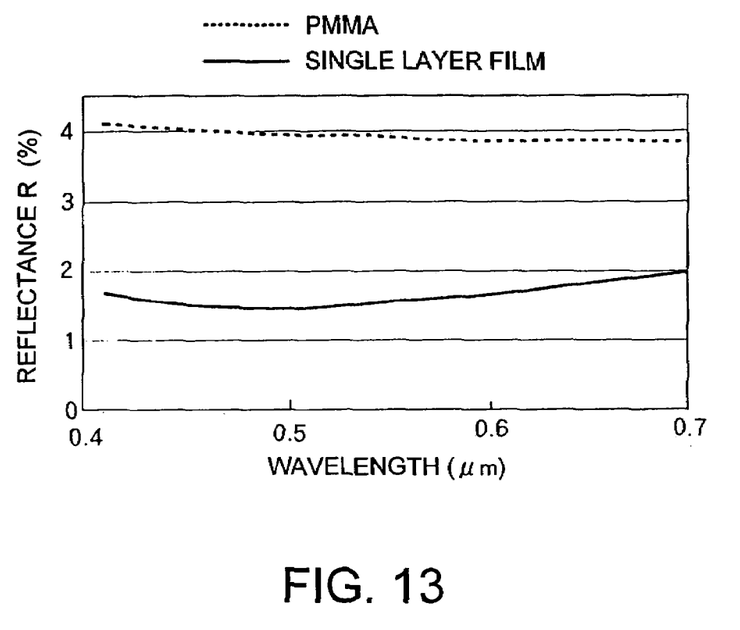
FIG. 13 is a graph showing the reflectance characteristic of the single layer anti-reflection film in FIG. 12.

FIG. 13 shows reflectance characteristics when PMMA (polymethylmethacrylate) is used as a substrate material and $MgF_2$ (n=1.38) is used as a thin film material at a design wavelength λ of 0.5 μm with an optical film thickness of 125 nm.

A dotted line in FIG. 13 represents the reflectance characteristic when only the PMMA substrate is used and no anti-reflection film is added, while a solid line represents the reflectance characteristics when a single layer anti-reflection film (with an optical film thickness of 125 nm) is added to the PMMA substrate.

When the single layer anti-reflection film is added, it can be seen that the reflectance is at the minimum near the wavelength of 500 nm as the design value calculated from the condition (2) and that the reflectance is generally suppressed in a visible region (approximately 400 to 700 nm) as compared with the case where only the PMMA substrate is used.

Next, description is made for an example of the structure of the minute periodic structure having a period smaller than the wavelength of incident light formed on a lens surface and its reflectance characteristics.

In the minute periodic structure of the rectangular grating shown in FIG. 4, the periodic structure is formed only one-dimensionally in Embodiments 1 to 3. PMMA (n=1.492) is used as a substrate material with a grating period (a grating pitch) Λ of 0.2 μm, a grating depth d1 of 0.1 μm, and a filling factor w/Λ, representing the ratio of the substrate material in the grating, of 0.5.

When the grating period Λ is equivalent to the wavelength of incident light, significant polarization characteristics, high wavelength dependence, and occurrence of higher-order diffracted light, typical in a resonant region, are observed to make it difficult to achieve desired reflection suppressing performance. If this is used in an actual optical system, higher-order diffracted light may be produced to cause so-called stray light. To prevent occurrence of such higher-order diffracted light, it is preferable to form the minute periodic structure with an appropriately set grating period Λ.

Figure 5:
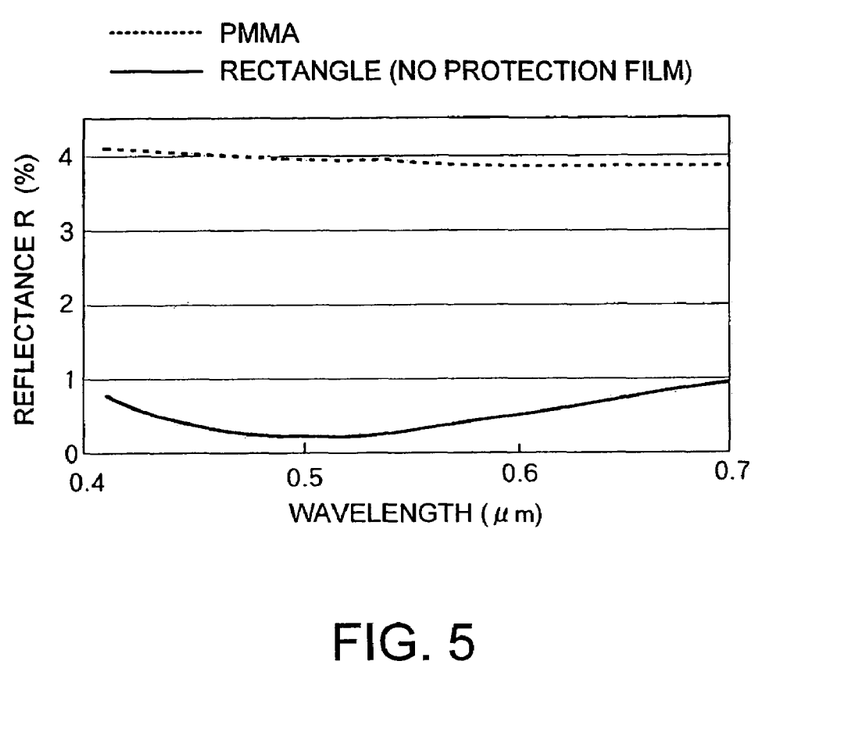
FIG. 5 is a graph showing the reflectance characteristic of the minute periodic structure in FIG. 4.

FIG. 5 shows the reflectance characteristic when the minute periodic structure of the rectangular grating shown in FIG. 4 is formed on the substrate. In FIG. 5, a dotted line represents the reflectance characteristic when only the PMMA substrate is used, and a solid line represents the reflectance characteristic when the typical minute periodic structure of the rectangular grating is formed on a surface of the PMMA substrate.

In the minute periodic structure of the triangular grating shown in FIG. 6, the periodic structure is formed only one-dimensionally in Embodiments 1 to 3. Other parameters representing the minute periodic structure are the same as those shown in FIG. 4.

Figure 7:
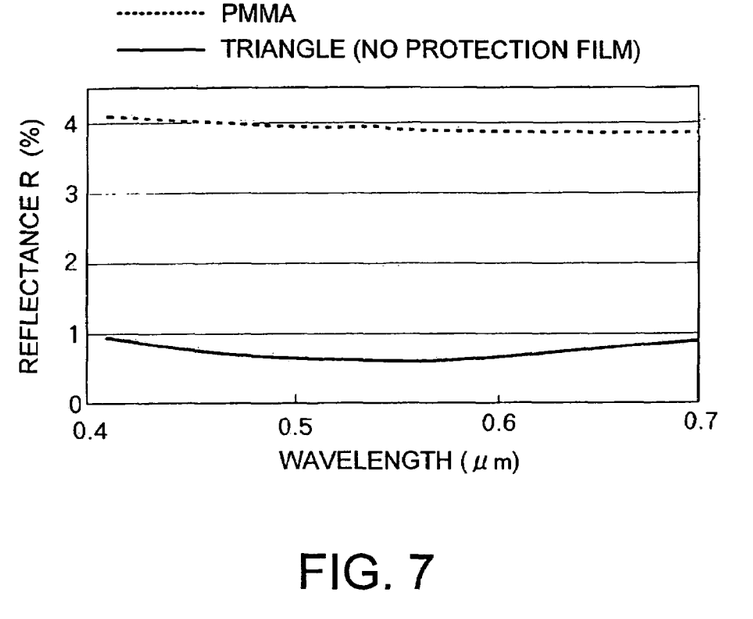
FIG. 7 is a graph showing the reflectance characteristic of the minute periodic structure in FIG. 6.

FIG. 7 shows the reflectance characteristic when the minute periodic structure of the triangular grating shown in FIG. 6 is formed on the substrate. In FIG. 7, a dotted line represents the reflectance characteristic when only the PMMA substrate is used, and a solid line represents the reflectance characteristic when the typical minute periodic structure of the triangular grating is formed on a surface of the PMMA substrate.

The reflectance was calculated by using a rigorous coupled-wave analysis which is vector diffraction theory. This is because scalar diffraction theory does not hold approximately and the exact reflectance cannot be determined in a region in which the grating period of the minute periodic structure is smaller than the incident light wavelength.

As shown in FIGS. 5 and 7, the reflectance is reduced over the entire wavelength range of incident light in the substrate having the minute periodic structure formed thereon as compared with the reflectance (provided by scalar calculations) of the PMMA substrate having no minute periodic structure. In other words, it can be seen that the minute periodic structure having the period smaller than the wavelength of incident light formed on the substrate surface can achieve the same effect as the reflection suppressing effect of the thin film made of the low refractive index material.

It can also be seen that, in the characteristic of the typical minute periodic structure, the reflectance is at the lowest for light in the neighborhood of wavelengths of 500 to 570 nm, and is increased at shorter wavelengths and longer wavelengths.

It should be noted that the shape of the grating in the minute periodic structure is not limited to the rectangle or the triangle as described above, and a minute periodic structure formed of a grating having a shape other than those can be provided on a surface of a substrate to provide the reflection suppressing effect.

In Embodiments 1 to 3, an aspherical lens made of a resin material is used as the substrate, and the minute periodic structure provided with characteristics later described is formed on a surface of the lens, thereby providing the reflection suppressing function and a color balance correcting function.

In general, available resin materials are limited as compared with glass. Resin lenses have low transmittance at shorter wavelengths, and the color balance tends to be shifted toward yellow. Glass lenses have various levels of transmittance, but desired color balance needs to be set in the whole optical system. Particularly, in an optical apparatus such as a silver-haloid camera, a digital camera, and a video camera, the color balance of the whole optical system is designed to fall within a desired range in consideration of which glass surface is provided with the reflection suppressing function. However, it may be difficult to maintain the color balance within the desired range when a countermeasure against ghost (a countermeasure for suppressing reflection) is taken.

A small number of types of anti-reflection films are available for resin lenses and it is difficult to exert the reflection suppressing effect as much as that of anti-reflection films added to glass lenses. If it is possible, high cost is required.

In each of Embodiments 1 to 3, the minute periodic structure has the favorable reflection suppressing function as well as the characteristic for correcting the color balance in the aspherical lens or the whole optical system.

Figure 8:
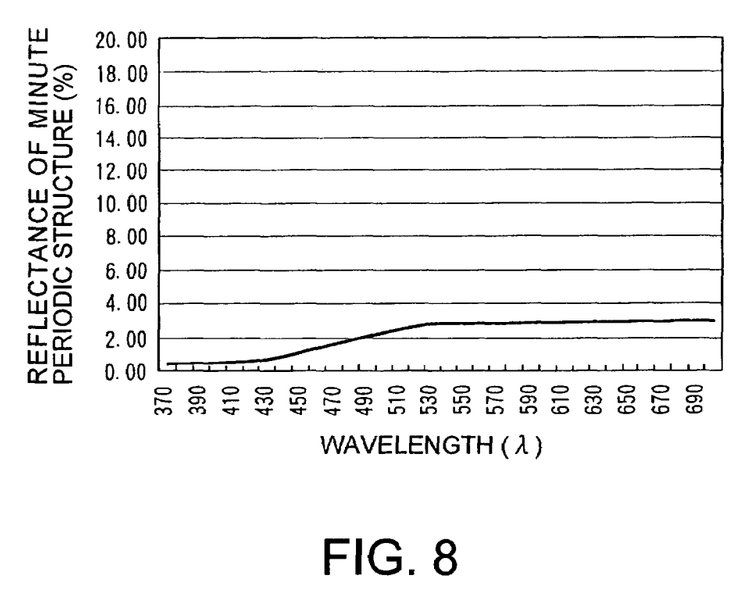
FIG. 8 is a graph showing the reflectance characteristic provided by the minute periodic structure of Embodiments 1 to 3.

FIG. 8 shows an example of the reflectance characteristic provided by the minute periodic structure. FIG. 9 shows the transmittance characteristic of a lens (or an optical system) having the minute periodic structure with the reflectance characteristic as shown in FIG. 8.

FIG. 8 shows the reflectance characteristic of the minute periodic structure formed on a surface of a single lens (a base material) with a thickness of 10 mm, a radius of curvature R1 of a surface on the object side equal to 100 mm, a radius of curvature R2 of a surface on the image plane side equal to −100 mm, a refractive index Nd of the material equal to 1.84666, and an Abbe number vd equal to 23.8, and FIG. 9 shows the transmittance characteristic of that lens. In the graph of FIG. 8, the horizontal axis represents a wavelength and the vertical axis represents the reflectance of the minute periodic structure. In the graph of FIG. 9, the horizontal axis represents a wavelength and the vertical axis represents the transmittance of the single lens (or the optical system).

As apparent from FIG. 8, in Embodiments 1 to 3, the minute periodic structure has the characteristic that the reflectance at shorter wavelengths (the wavelengths of the blue color range shorter than the wavelengths of the green color range in the neighborhood of 500 to 570 nm) in the wavelength range of incident light (visible light) is lower than the reflectance of light at longer wavelengths (the wavelengths of the green color range or longer). This means that, as shown in a characteristic curve B of FIG. 9, the transmittance of light at wavelengths of the blue color range is relatively increased with respect to the transmittance of light at wavelengths of the green color range and the red color range. Consequently, the optical system can have the transmittance at substantially the same level over all the wavelength ranges of blue, green, and red.

Therefore, the minute periodic structure can improve the phenomenon of white looking yellowy due to the lower transmittance (the higher reflectance) of light in the blue range than the transmittance of light in the green and red ranges when no minute periodic structure is provided (as shown by the characteristic curve A), thus allowing favorable color balance.

When extreme correction is made only by the minute periodic structure, however, the transmittance may be reduced to increase the reflectance at some wavelengths, which is disadvantageous in terms of ghost. Thus, the following condition is preferably satisfied:

$$0 < \Delta R < 5.0 \quad (3)$$

where $\Delta R$ (%) represents the difference between the minimum reflectance and the maximum reflectance in the wavelength range of incident light.

As described above, according to Embodiments 1 to 3, it is possible to take the countermeasure against ghost and increase flexibility in design while the color balance is maintained in the optical system including the aspherical lens having the minute periodic structure.

It should be noted that the reflectance characteristics and parameters of the minute periodic structure may be any as long as the reflection suppressing function and the color balance correcting function as described above are ensured.

In addition, it is preferable to satisfy at least one of the following conditions and conditions (A) to (H).

(A) The minute periodic structure satisfies the following condition:

$$Rm < Rb \quad (4)$$

where Rm represents the reflectance of light at the shortest wavelength in the wavelength range of incident light, and Rb represents the reflectance of light at the design wavelength.

The color balance of transmitted light is often shifted toward yellow, and to make correction thereof, an anti-reflection film may be added to provide reflected light which includes a large amount of components at the wavelengths of red. However, if ghost occurs on that surface, the ghost is noticeable with a reddish color.

The condition (4) can be satisfied to correct the transmittance characteristic (color balance) of the aspherical lens or the optical system by the minute periodic structure to increase flexibility in optical design.

(B) The minute periodic structure satisfies the following condition:

$$h0/hx < 1 \quad (5)$$

where h0 represents the maximum height of an axial luminous flux which passes through the surface (the lens surface) having the minute periodic structure formed thereon, and hx represents the maximum height of a luminous flux (an off-axis luminous flux) which forms the maximum field angle.

It is preferable that the condition (5) is satisfied in order to take full advantage of the reflection suppressing function of the minute periodic structure. The condition (5) defines the range of the ratio of the maximum diameters of the axial luminous flux and the off-axis luminous flux which pass through the surface of the minute periodic structure. The axial luminous flux relatively away from the off-axis luminous flux on the surface is preferable so that it is expected that the reflectance characteristics of the minute periodic structure may exert a great effect.

(C) The aspherical lens and the minute periodic structure are simultaneously formed through molding.

The shape of the minute periodic structure is preferably formed on the mold of the resin lens for manufacture through molding to allow the simultaneous formation of the aspherical lens and the minute periodic structure with excellent time efficiency and lower cost.

(D) The minute periodic structure has structural parameters continuously or step by step changed from the center toward the periphery of the lens surface.

Such a structure is preferable since the reflectance characteristic can be changed in accordance with an incident angle of incident light.

(E) The minute periodic structure satisfies the following condition:

$$0.02 < P/\lambda < 0.8 \quad (6)$$

where P represents the period (the grating pitch) of the minute periodic structure, and $\lambda$ represents a design reference wavelength.

The condition (6) defines the ratio of the grating period to the design wavelength and is provided for achieving an appropriate reflection suppressing effect. When a value of the P/$\lambda$ is less than the lower limit of the condition (6) (0.02), it is not preferable since a favorable reflection suppressing function is difficult to achieve and manufacture is not easily performed. On the other hand, when a value of the P/$\lambda$ is greater than the upper limit of the condition (6) (0.8), it is not preferable since the reflection suppressing function is difficult to achieve.

(F) The aspherical lens has minute periodic structures on both lens surfaces.

It is preferable that minute periodic structures are provided on both surfaces of the aspherical lens made of resin. If the minute periodic structure is provided only on one of the surfaces, an anti-reflection film is formed or no film is formed on the other surface. However, the formation of the anti-reflection film is not preferable in terms of cost, and providing no film is not preferable since ghost presents a problem.

(G) An area with no minute periodic structure is provided in part of the lens surface having the minute periodic structure formed thereon except an effective area for ray of the lens surface.

Such an area is provided so that the lens can be mechanically received in that area with no minute periodic structure when the lens is fixed in an optical axis direction in a manufacture process or on a lens barrel, since breakage is likely to occur in the minute periodic structure.

The lens needs to be fixed at a precise position on a barrel in an actual optical system. It is preferable to receive the lens surface mechanically in order to ensure the positional accuracy, especially in the optical axis direction. Since the lens surface has higher accuracy than the peripheral shape, the lens surface can be mechanically received to reduce errors of the lens itself occurring on the receiving surface in the optical axis direction.

In addition, for example when aspherical lenses are placed in a line in the process of manufacturing an optical system, the condition (G) is also effective since the lens must be supported in the optical axis direction to prevent the lens from falling to damage the minute periodic structure. It should be noted that any protrusion formed on the outer periphery of the lens is not preferable since it increases the outer diameter of the lens.

(H) The aspherical lens having the minute periodic structure should be disposed between the stop and the image plane.

In general, diffraction occurs as the stop diameter of an optical system is smaller, and ghost is created with the stop serving as a light source. This is called a flare spot. The flare spot occurs at a surface between the stop and the image plane. It is often formed into an image since the light source is close to the optical axis, and it is easily noticeable since it occurs close to the center.

The aspherical lens having the favorable reflection suppressing function disposed between the stop and the image plane is preferable since it can alleviate the flare spot.

The aspherical lens made of a resin material involves variations in focal length to change the focus of the optical system depending on environmental changes such as humidity and temperature, so that its power is desirably set to be relatively low. Since the low power causes close curvatures of lens surfaces on the object side and the image plane side of the aspherical lens, ghost tends to occur due to the two surfaces. However, the strength of the ghost can be reduced by providing the minute periodic structure of Embodiments 1 to 3 to reduce the reflectance.

Next, Numerical Examples of Embodiments 1 to 3 described above are shown. Numerical Example 1, Numerical Example 2, and Numerical Example 3 correspond to the image-taking optical system of Embodiment 1, the image-taking optical system of Embodiment 2, and the image-taking optical system of Embodiment 3, respectively.

In each of Numerical Examples, Ri represents the radius of curvature of an i-th surface in order from the object side, Di the thickness of an i-th lens element or the air spacing between an i-th optical surface and an (i+1)-th optical surface, and Ni and vi the refractive index and Abbe number of the material of an i-th lens element.

The aspherical surface is represented by the following condition:

$$X = \frac{(1/R)Y^2}{1 + (1 - (Y/R)^2)^{1/2}} + AY^2 + BY^4 + CY^6 + DY^8 + EY^{10} + FY^{12}$$

where R represents the radius of curvature of the lens surface at its center, the optical axis direction is defined as an X axis, and the direction perpendicular to the optical axis is defined as a Y axis, and A, B, C, D, E, and F represent aspherical coefficients.

In each of Numerical Examples 1 to 3, the mark * is added to the left of the surface number of a surface on which the minute periodic structure is provided.

In addition, f represents the focal length of the overall image-taking optical system, Fno the F number, and $\omega$ the half field angle. In addition, $e \pm X$ represents $\times 10^{\pm X}$.

NUMERICAL EXAMPLE 1

| f = 100.00 to 299.74 Fno = 4.12 to 5.88 2ω = 73.5 to 28.0 | | | |
|---|---|---|---|
| R 1 = 181.221 | D 1 = 6.21 | N 1 = 1.772499 | ν 1 = 49.6 |
| R 2 = 80.301 | D 2 = 34.10 | | |
| R 3 = −438.223 | D 3 = 5.52 | N 2 = 1.516330 | ν 2 = 64.1 |
| R 4 = 120.884 | D 4 = 6.22 | | |
| R 5 = 115.765 | D 5 = 17.01 | N 3 = 1.728250 | ν 3 = 28.5 |
| R 6 = 264.440 | D 6 = variable | | |
| R 7 = 137.240 | D 7 = 10.97 | N 4 = 1.563839 | ν 4 = 60.7 |
| R 8 = −334.599 | D 8 = 0.82 | | |
| R 9 = 89.234 | D 9 = 5.49 | N 5 = 1.846660 | ν 5 = 23.8 |
| R10 = 51.492 | D10 = 25.71 | N 6 = 1.571351 | ν 6 = 53.0 |
| R11 = −444.797 | D11 = variable | | |
| R12 = stop | D12 = 6.28 | | |
| R13 = −227.765 | D13 = 2.76 | N 7 = 1.800999 | ν 7 = 35.0 |
| R14 = 46.529 | D14 = 11.52 | N 8 = 1.846660 | ν 8 = 23.8 |
| R15 = 176.472 | D15 = variable | | |
| *R16 = −182.673 | D16 = 5.49 | N 9 = 1.583060 | ν 9 = 30.2 |
| *R17 = 373.983 | D17 = 0.82 | | |
| R18 = 332.713 | D18 = 21.74 | N10 = 1.487490 | ν10 = 70.2 |
| R19 = −80.553 | | | |

| variable distance | focal length | | |
|---|---|---|---|
| | 100.00 | 134.11 | 299.74 |
| D6 | 142.55 | 85.01 | −6.95 |
| D11 | 5.49 | 11.69 | 41.90 |
| D15 | 43.55 | 37.34 | 7.13 | aspherical coefficient

17th surface:

k = 0.00000e+00 A = 0 B = 5.11654e−07 C = 2.74222e−12
D = −8.82696e−15 E = 0.00000e+00 F = 0.00000e+00

NUMERICAL EXAMPLE 2

| f = 100.00 to 449.38 Fno = 5.70 to 10.00 2ω = 58.3 to 14.2 | | | |
|---|---|---|---|
| R 1 = 40.170 | D 1 = 3.10 | N 1 = 1.841870 | ν 1 = 27.7 |
| R 2 = 33.479 | D 2 = 0.26 | | |
| R 3 = 32.668 | D 3 = 8.59 | N 2 = 1.487000 | ν 2 = 70.2 |
| R 4 = 68.889 | D 4 = variable | | |
| R 5 = −30.900 | D 5 = 3.10 | N 3 = 1.752272 | ν 3 = 51.0 |
| R 6 = −64.952 | D 6 = 1.55 | | |
| R 7 = stop | D 7 = 2.84 | | |
| R 8 = 92.729 | D 8 = 11.61 | N 4 = 1.516330 | ν 4 = 64.1 |
| R 9 = −28.281 | D 9 = variable | | |
| *R10 = −59.346 | D10 = 8.57 | N 5 = 1.583400 | ν 5 = 30.2 |
| *R11 = −49.493 | D11 = 6.12 | | |
| R12 = −29.025 | D12 = 2.58 | N 6 = 1.697000 | ν 6 = 55.5 |
| R13 = −273.739 | | | |

| variable distance | focal length | | |
|---|---|---|---|
| | 100.00 | 167.41 | 449.38 |

| f = 100.00 to 449.38 Fno = 5.70 to 10.00 2ω = 58.3 to 14.2 | | | |
|---|---|---|---|
| D 4 | 14.47 | 27.69 | 41.76 |
| D 9 | 30.12 | 16.88 | 2.84 | aspherical coefficient

8th surface:

k = 0.00000e+00 A = 0 B = −5.77847e−06 C = −1.60087e−08
D = 3.22720e−11 E = −4.47384e−13 F = 0.00000e+00

9th surface:

k = 0.00000e+00 A = 0 B = 4.33495e−06 C = −1.62195e−08
D = 3.84412e−11 E = −2.73937e−13 F = 0.00000e+00

10th surface:

k = 0.00000e+00 A = 0 B = 6.65064e−06 C = −2.92558e−08
D = 1.63672e−10 E = −3.70074e−13 F = 2.71550e−16

11th surface:

k = 0.00000e+00 A = 0 B = 5.36790e−07 C = −1.46535e−08
D = 6.65967e−11 E = −1.20354e−13 F = 5.35997e−17

NUMERICAL EXAMPLE 3

| f = 100.00 to 367.90 Fno = 5.75 to 13.00 2ω = 73.5 to 22.9 | | | |
|---|---|---|---|
| R 1 = 69.519 | D 1 = 5.41 | N 1 = 1.487490 | ν 1 = 70.2 |
| R 2 = 189.934 | D 2 = 4.18 | | |
| R 3 = −59.089 | D 3 = 8.22 | N 2 = 1.834000 | ν 2 = 37.2 |
| R 4 = −274.866 | D 4 = 5.20 | | |
| R 5 = 1255.232 | D 5 = 9.49 | N 3 = 1.563839 | ν 3 = 60.7 |
| R 6 = −80.265 | D 6 = 3.40 | | |
| R 7 = stop | D 7 = 3.81 | | |
| R 8 = 987.461 | D 8 = 7.79 | N 4 = 1.516330 | ν 4 = 64.1 |
| R 9 = −47.960 | D 9 = variable | | |
| *R10 = −208.180 | D10 = 8.22 | N 5 = 1.583060 | ν 5 = 30.2 |
| *R11 = −137.198 | D11 = 18.26 | | |
| R12 = −33.593 | D12 = 4.76 | N 6 = 1.772499 | ν 6 = 49.6 |
| R13 = −154.652 | | | |

| variable distance | focal length | | |
|---|---|---|---|
| | 100.00 | 167.43 | 367.90 |
| D 9 | 35.85 | 17.34 | 2.38 | aspherical coefficient

5th surface:

A = 0.00000e+00 B = −2.34740e−06 C = −1.38078e−09
D = 1.21524e−12 E = −7.57539e−15 F = 0.00000e+00

6th surface:

A = 0.00000e+00 B = 6.40392e−08 C = 3.77419e−10
D = −3.86301e−13 E = 0.00000e+00 F = 0.00000e+00

10th surface:

A = 0.00000e+00 B = 1.25952e−06 C = 9.68583e−10
D = 3.86231e−12 E = −2.11300e−15 F = 9.29663e−19

11th surface:

A = 0.00000e+00 B = −6.59556e−07 C = 1.69545e−09
D = −3.28147e−12 E = 5.52162e−15 F = −1.19599e−18

Embodiment 4

When the minute periodic structure is formed on the aspherical lens made of a resin material described above, the aspherical lens may be difficult to manufacture and require high cost if the minute periodic structure is complicated. The simplest solution is to form a minute periodic structure on a single lens surface with a single mold, for which it is necessary to take account of a direction in which the structure is removed from the mold.

To address the need, in Embodiment 4, the minute periodic structure can be removed from the mold in molding substantially in an optical axis direction by forming the minute periodic structure such that all the surfaces (the side surfaces of the grating elements) constituting the grating are visible when the lens surface having the minute periodic structure formed thereon is viewed oppositely from the optical axis direction.

Figure 10:
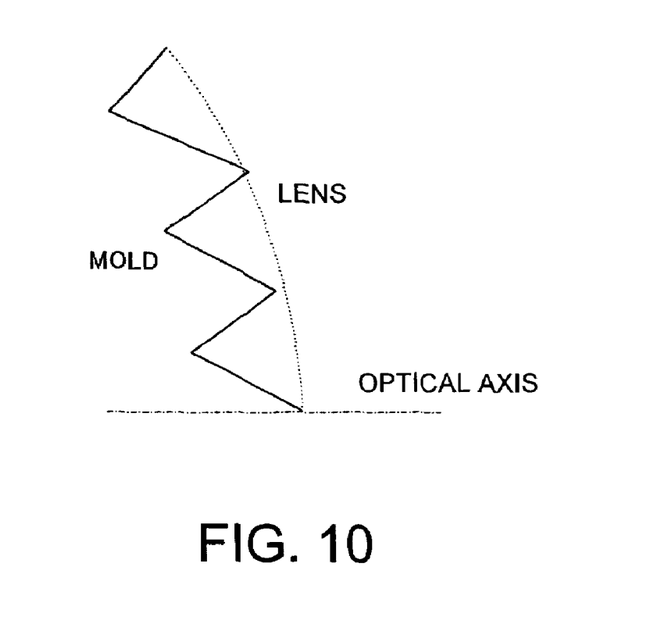
FIG. 10 is a section view showing the shape of a minute periodic structure in an optical element which is Embodiment 4 of the present invention.

FIG. 10 is a section view of a lens surface having a minute periodic structure of Embodiment 4 formed thereon. Surfaces which constitute grating elements (inclined surfaces) are formed such that all of them can be seen when the grating surfaces are viewed oppositely from the optical axis direction. Such a structure can be removed from the mold substantially along the optical axis direction.

Figure 11:
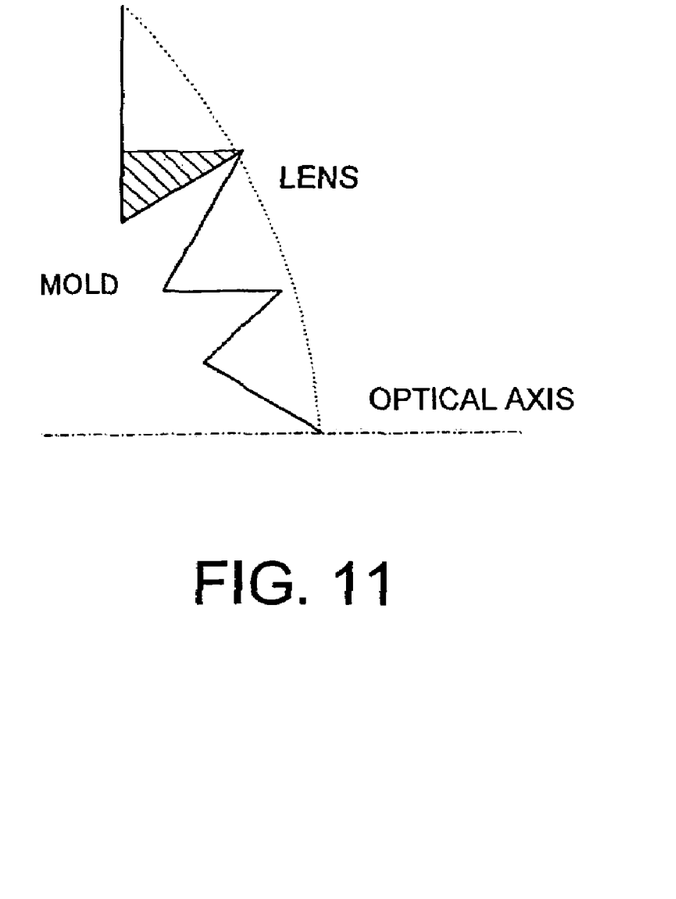
FIG. 11 is a section view showing the shape of a minute periodic structure in an optical element.

On the other hand, in a minute periodic structure as shown in FIG. 11, all of surfaces constituting the grating (inclined surfaces) are not visible when the grating surfaces are viewed oppositely from an optical axis direction, and the structure cannot be removed from a mold substantially in the optical axis direction due to a hatched portion which cannot be seen. It is thus necessary to take measures such as using divided molds, which involves high cost and makes it difficult to achieve high accuracy.

While each of Embodiments 1 to 4 has been described for the case where the minute periodic structure is provided on the aspherical lens, the present invention is applicable to a minute periodic structure provided on aspherical lens or an element substrate such as a parallel plate.

Embodiment 5

Figure 14:
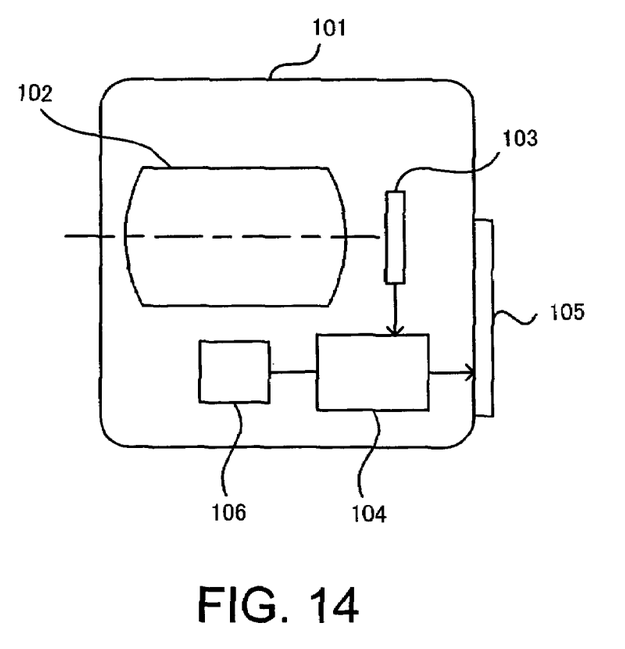
FIG. 14 is a schematic diagram showing an image-taking apparatus which has the image-taking optical system of Embodiments 1 to 3.

FIG. 14 shows the structure of an image-taking apparatus which has the optical system shown in Embodiments 1 to 3 described above.

In FIG. 14, reference numeral 101 shows the image-taking apparatus such as a still camera and a video camera, and reference numeral 102 shows the image-taking optical system of Embodiments 1 to 3. Reference numeral 103 shows an image-pickup element (or a silver-haloid film) such as a CCD sensor and a CMOS sensor which photo-electrically converts an subject image formed by the image-taking optical system. The image-pickup element (or film) 103 is disposed on an image plane of the image-taking optical system 102. A signal output from the image-pickup element 103 is subjected to various types of processing by an image processing circuit 104 to create an image signal. The image signal is displayed on a display 105 or recorded on a recording medium 106 such as a semiconductor memory, an-optical disc, and a magnetic tape.

While Embodiment 5 has been described for the optical element used in the image-taking optical system of the image-taking apparatus, the optical element of the present invention is applicable to another optical system such as a projection lens of a projector.

As describe above, according to each of Embodiments 1 to 5, the minute periodic structure formed on the surface of the base member of the optical element can be provided with both the reflection suppressing function and the color balance correcting function. Particularly, the surface of the base member formed as the aspherical surface can provide both the functions more effectively.

The minute periodic structure has the characteristic that the reflectance of light at the wavelengths of blue is lower than the reflectance of light at the wavelengths of green and red in the wavelength range of visible light. This can set the transmittance of the optical system to substantially the same level over all the wavelength ranges of blue, green, and red, so that favorable color balance can be achieved.

Since the condition (3) is satisfied, the occurrence of ghost can be reduced.

In addition, since the condition (4) is satisfied, the transmittance characteristic (color balance) of the aspherical lens or the optical system can be corrected by the minute periodic structure to increase flexibility in optical design.

The condition (5) is satisfied, so that it is possible to exert the aforementioned functions from the reflectance characteristic of the minute periodic structure.

The minute periodic structure can be integrally formed on the base member through molding to attain reduced cost.

Furthermore, since the minute periodic structure has the continuously or step by step changing parameters, the reflectance characteristic can be changed in accordance with the incident angle of incident light to achieve optimal design of the minute periodic structure.

Since the condition (6) is satisfied, the favorable reflection suppressing function can be provided.

The minute periodic structures formed on both surfaces of the base member are advantageous in terms of cost as compared with the case where the minute periodic structure is formed only on one of the surfaces and an anti-reflection film is applied to the other surface, and in terms of reduced ghost as compared with the case where no film is applied to the other surface.

The area with no minute periodic structure is provided on the base member except the effective area for ray. Thus, the optical element is easily fixed in the manufacture process or on a lens barrel without increasing the size of the optical element, thereby making it possible to reduce errors in disposing the optical element in the optical axis direction.

Since the optical element is placed between the stop and the image plane, the flare spot can be reduced.

While preferred embodiments have been described, it is to be understood that modification and variation of the present invention may be made without departing from the scope of the following claims.

This application claims priority from Japanese Patent Application No.2003-293140 filed on Aug. 13, 2003, which is hereby incorporated by reference herein.

What is claimed is:

1. An optical element comprising:
   a base member; and
   a periodic structure which is provided on a surface of the base member and has a period smaller than a wavelength of incident light on the optical element,
   wherein the base member is formed of resin, and the periodic structure is integrally formed with the base member through molding, and
   wherein the periodic structure has a characteristic that a reflectance of light for each wavelength in a range of 400 nm to 500 nm of the incident light is lower than a reflectance of light for each wavelength in a range of 570 nm to 700 nm of the incident light.

2. The optical element according to claim 1, wherein the base member includes a surface in an aspherical shape.

3. The optical element according to claim 1, wherein the periodic structure has a characteristic that a reflectance of light at a wavelength of blue is lower than a reflectance of light at wavelengths of green and red in a wavelength range of visible light.

4. The optical element according to claim 1, wherein the periodic structure satisfies the following condition:

$$0 < \Delta R < 5.0$$

where ΔR (%) represents a difference between a minimum reflectance and a maximum reflectance in a wavelength range of 400 nm to 700 nm.

5. The optical element according to claim 1, wherein the base member is a lens member, and the periodic structure is provided on a lens surface of the lens member and satisfies the following condition:

$$h0/hx < 1$$

where h0 represents a maximum height of an axial luminous flux which passes through the lens surface, and hx represents a maximum height of a luminous flux which forms a maximum field angle.

6. The optical element according to claim 1, wherein the periodic structure satisfies the following condition:

$$002 < P/\lambda < 0.8$$

where P represents a period of the periodic structure, and λ represents a design reference wavelength of the incident light.

7. The optical element according to claim 1, wherein the periodic structure has a parameter of the structure, which is changed continuously or step by step from a center portion toward a periphery portion of the optical element.

8. An optical element comprising:
   a base member; and
   a periodic structure which is provided on a surface of the base member and has a period smaller than a wavelength of incident light on the optical element,
   wherein the periodic structure has a characteristic that a reflectance of light for each wavelength in a range of 400 nm to 500 nm of the incident light is lower than a reflectance of light for each wavelength in a range of 570 nm to 700 nm of the incident light, and
   wherein the base member is a lens member, and the periodic structure is provided on each of lens surfaces on both sides of the lens member.

9. The optical element according to claim 1, wherein the base member is a lens member, the periodic structure is provided on a lens surface of the lens member, and the lens surface has an area in which the periodic structure is not provided outside an effective area for rays.

10. An optical system comprising:
    the optical element according to claim 1.

11. The optical system according to claim 10, wherein the optical element is disposed between a stop and an image surface.

12. An optical apparatus comprising:
    an optical system which includes the optical element according to claim 1.

* * * * *

UNITED STATES PATENT AND TRADEMARK OFFICE
CERTIFICATE OF CORRECTION

| | |
|---|---|
| PATENT NO. | : 7,256,947 B2 |
| APPLICATION NO. | : 10/916121 |
| DATED | : August 14, 2007 |
| INVENTOR(S) | : Takeshi Nishimura |

It is certified that error appears in the above-identified patent and that said Letters Patent is hereby corrected as shown below:

On the Title Page, Section (56), Foreign Patent Documents, change

"JP-2001-183506  10/1983" to --JP 2001-183506  7/2001--

In Column 13, Line 25, change "002<P/$\lambda$<0.8" to --0.02<P/$\lambda$<0.8--

Signed and Sealed this

Twenty-seventh Day of November, 2007

JON W. DUDAS
*Director of the United States Patent and Trademark Office*